US005509505A

United States Patent [19]

Steger et al.

[11] Patent Number: 5,509,505

[45] Date of Patent: Apr. 23, 1996

[54] ARRANGEMENT FOR DETECTING ELEVATOR CAR POSITION

[75] Inventors: Rudolph Steger, West Hartford; Chester J. Slabinski, New Hartford; Michael Garfinkel, West Hartford, all of Conn.

[73] Assignee: Otis Elevator Company, Farmington, Conn.

[21] Appl. No.: 372,709

[22] Filed: Jan. 13, 1995

Related U.S. Application Data

[63] Continuation of Ser. No. 129,570, Sep. 29, 1993, abandoned.

[51] Int. Cl.[6] .............................. B66B 3/00; G01B 11/14

[52] U.S. Cl. .......................... 187/394; 187/393; 356/375; 250/341.7; 250/345

[58] Field of Search .................................... 187/393, 394, 187/391, 283, 282; 250/341.7, 345, 271; 356/375; 116/209

[56] References Cited

U.S. PATENT DOCUMENTS

| | | | |
|---|---|---|---|
| 3,747,710 | 7/1973 | Winkler | 187/118 |
| 3,779,346 | 12/1973 | Winkler | 187/117 |
| 3,785,463 | 1/1974 | Kuhl et al. | 187/118 |
| 4,083,430 | 4/1978 | Gingrich | 187/134 |
| 4,245,721 | 1/1981 | Masel | 187/29 |
| 4,245,726 | 1/1981 | Kohler | 191/23 A |
| 4,256,203 | 3/1981 | Masel | 187/113 |
| 4,375,057 | 2/1983 | Weise et al. | 340/21 |
| 4,520,904 | 6/1985 | Rado et al. | 187/113 |
| 4,564,085 | 1/1986 | Melocik et al. | 187/9 R |
| 4,789,049 | 12/1988 | Watanabe et al. | 187/130 |
| 4,831,561 | 5/1989 | Utsaumi | 364/560 |
| 5,005,979 | 4/1991 | Sontag et al. | 356/375 |

OTHER PUBLICATIONS

Michel F. Laguesse, Optical Potentiometer Using Fluorescent Optical Fiber for Position Measurement, Dec. 1989, pp. 5144–5148.

Bernard Chiron, Highly Efficient Plastic Optical Fluorescent Fibers and Sensors undated, 12 pages.

Optectron specification, Fluroescent Plastic Optical Fibers, Sep. 1991 2 pages.

*Primary Examiner*—Peter S. Wong
*Assistant Examiner*—Robert Nappi
*Attorney, Agent, or Firm*—Joseph P. Abate

[57] ABSTRACT

An arrangement for detecting elevator car position relative to a floor landing includes an optical potentiometer associated with both the elevator car and the interior of an elevator hoistway. One portion of the potentiometer is attached to the elevator car, while the other portion of the potentiometer is fixed within the hoistway. Car position is ascertained by illuminating portions of a fluorescent fiber optical cable and then reading electrical signals outputted by photodetectors at either end of the cable. The difference between the electrical signals corresponds to the distance of the elevator car from the landing.

4 Claims, 10 Drawing Sheets

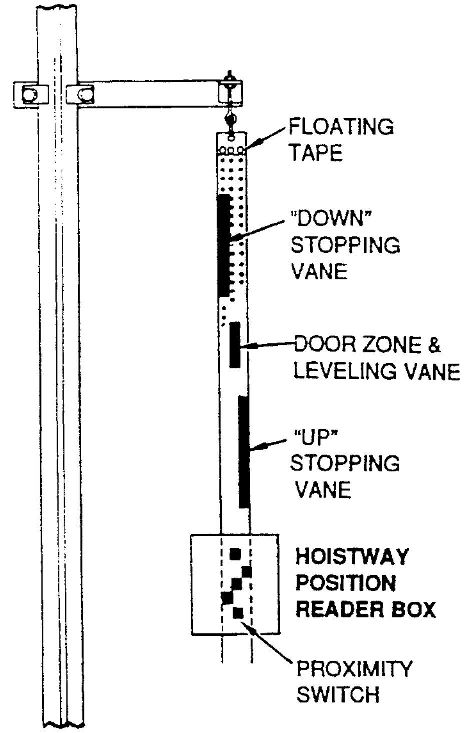
*fig.2*
PRIOR ART
*fig.3*
PRIOR ART
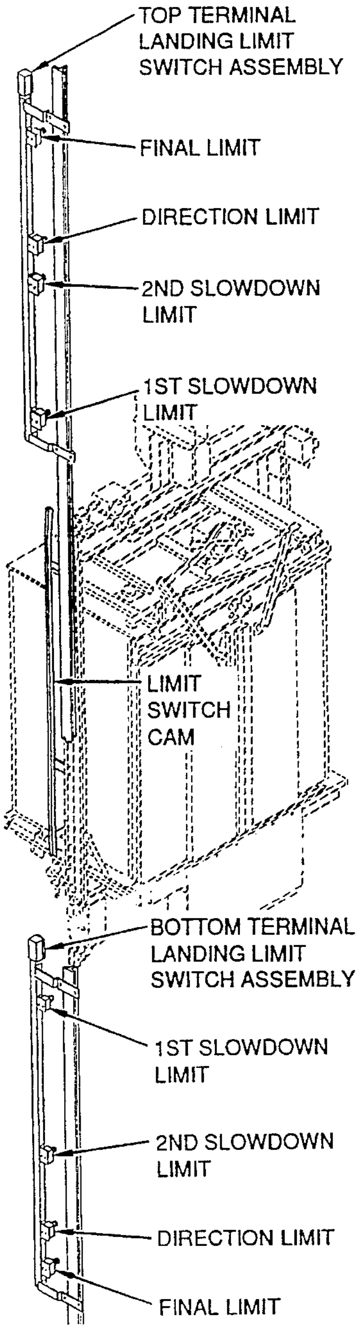

CONSIDERING FIG.4 AND SUPPOSING THE SOURCE LIGHT TO BE A CONCENTRATED BEAM, WE APPROXIMATE THE SIGNALS DELIVERED BY $PD1$ AND $PD2$ AS FOLLOWS:

$$R_1 = C_1 \eta_a \eta_b I \exp(-\alpha x), \qquad (1)$$

$$R_2 = C_2 \eta_a \eta_b I \exp[-\alpha(L - x)], \qquad (2)$$

WHERE $I$ IS THE SOURCE INTENSITY;

$\eta_a$ IS THE RATIO OF THE FLUORESCENCE LIGHT ENERGY TO THE EXCITATION LIGHT ENERGY;

$\eta_a$ IS THE FRACTION IN TERMS OF THE TOTAL FLUORESCENCE ENERGY OF THE ENERGY EMITTED IN THE FIBER ACCEPTANCE CONE AND GUIDED TOWARD $PD1$ AND $PD2$;

$C_1$ IS A FACTOR REPRESENTING (1) THE ATTTENUATION INTRODUCED BY A CLASSICAL FIBER EVENTUALLY USED TO CONNECT ONE END OF THE FLOURESCENT FIBER TO $PD1$, (2) THE COUPLING LOSSES BETWEEN THIS FIBER AND $PD1$, AND (3) THE PHOTODETECTOR RADIANT SENSITIVITY;

$C_2$ IS ANOTHER FACTOR REPRESENTING THE SAME EFFECTS AS $C_1$ BUT FOR CHANNEL 2;

$x$ IS THE SLIDER POSITION ALONG THE FLUORESCENT FIBER;

$L$ IS THE LENGTH OF THIS FIBER; AND $\alpha$ IS THE FIBER ATTENUATION COEFFFICIENT.

THE COEFFICIENT $\alpha$ IS TAKEN AS BEING CONSTANT WHATEVER THE VALUE OF $x$, AND THE FLUORESCENT FIBER IS CONSIDERED TO BE HOMOGENEOUS.

THE RATIO $C_1/C_2$ MAY BE ELIMINATED BY FIRST TAKING TWO MEASUREMENTS WITH THE SLIDER PLACED AT THE MIDDLE OF THE FIBER:

$$R'_1 = C_1 \eta'_a \eta_b I' \exp(-\alpha L/2), \qquad (3)$$

$$R'_2 = C_2 \eta'_a \eta_b I' \exp(-\alpha L/2), \qquad (4)$$

Prior Art
FIG.4A(a)

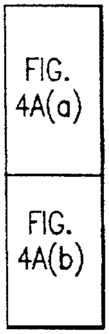

Prior Art
FIG.4A

THE FACTOR $I'$ MAY DIFFER FROM $I$ SINCE THE SOURCE INTENSITY MAY DRIFT WITH TIME, WHILE $\eta'_a$ MAY BE DIFFERENT FROM $\eta_a$ SINCE THIS COEFFICIENT AMONG OTHER THINGS DEPENDS ON THE SEPARATION BETWEEN THE SLIDER AND FIBER DURING THE SLIDER MOTION.

EQUATIONS (1)–(4) MAY BE SOLVED FOR $x$ GIVING $$x = \frac{L}{2} - \frac{1}{2\alpha} \ln\left[\frac{R_1/R'_1}{R_2/R'_2}\right]. \qquad (5)$$

FROM THIS EXPRESSION, THE SLIDER POSITION $x$ IS OBTAINED BY MEASURING THE FOUR QUANTITIES $R_1, R'_1, R_2$, AND $R'_2$. THE RESULT IS SEEN TO BE INDEPENDENT OF ANY VARIATIONS OF (1) THE SOURCE INTENSITY, (2) THE COUPLING BETWEEN THE SOURCE AND FLUORESCENT FIBER, (3) THE LOCAL FLUORESCENCE EFFICIENCY, (4) THE COUPLING BETWEEN THE SOURCE AND DETECTORS, AND (5) THE DETECTORS, RADIANT SENSITIVITY. THE MEASUREMENTS COULD, HOWEVER, BE AFFECTED IF DIFFERENTIAL DETECTOR SENSITIVITY DRIFT OCCURRED.

Prior Art

FIG.4A(b)

ONE SENSOR AND ONE DETECTOR CIRCUIT
(COMMON CONTROL UNIT NOT SHOWN)

ARRANGEMENT FOR DETECTING ELEVATOR CAR POSITION

This application is a continuation of application Ser. No. 08/129,570 filed Sep. 29, 1993, now abandoned.

FIELD OF THE INVENTION

The present invention relates to sensor arrangements and, more particularly, to arrangements for sensing a position of a movable unit (such as an elevator car) relative to a stationary location (such as an elevator floor or landing).

DESCRIPTION OF THE PRIOR ART

Door zone detection (i.e. detecting a position of an elevator car relative to a landing) typically requires three binary sensors to indicate when the car is either flush with the floor or when a re-leveling operation is required. The typical configuration is a vane/switch arrangement wherein the vane is in the hoistway and the three switches are mounted to the car. The switches are spaced such that the vane is shorter than a gap between the top and the bottom switches. With the middle switch active and the top and bottom switches inactive, the car is considered level to the floor. If the car were to move, either the top switch or the bottom switch would indicate both a need and a direction for re-leveling. Prior art implementations for door zone detection have included steel vanes with electromechanical switches, magnets with hall effect sensors and opaque or reflective vanes with opto-interrupt or opto-reflective devices. In these prior art implementations, the detection produces three binary signals (door zone, level up and level down). Also, precise car position is typically not available in these implementations. Door zone accuracy and leveling zone tolerances are fixed by the mechanical adjustments of the vanes and switches.

Terminal zone detection is required as an additional means to ensure that a car is properly decelerating into the top or a bottom landing. Again, a vane and switch arrangement (similar to the arrangements discussed above) are utilized to indicate the car's arrival at a fixed distance from the terminal landings, independent of the normal car position system (encoder). Again, only a discrete signal is generated corresponding to a fixed distance from a terminal landing.

Various prior art implementations are shown and described, for example, in U.S. Pat. Nos. 4,520,904, 4,256,203, 4,245,721, 3,785,463, 3,779,346 and 3,747,710.

Although these prior art implementations have proven to be satisfactory, the present inventors believe that further improvements in arrangements for sensing or detecting the position of an elevator car relative to a landing are achievable. The present inventors believe that employing optical fiber technology can substantially improve arrangements for detecting or sensing elevator car position within these zones.

Optical potentiometers per se are known. An optical source (OS) acts as a slider and the potentiometer track is formed by a fluorescent optical fiber. See FIGS. 4, 4A and an article entitled "Optical Potentiometer using Fluorescent Optical Fiber for Position Measurement", by Michael F. Laguesse, *Applied Optics,* Vol. 28, No. 23, Dec. 1, 1989, pp. 5144–5148.

However, the present inventors believe that adapting this technology to the elevator art will substantially improve car position measurement arrangements.

SUMMARY OF THE INVENTION

According to the present invention, an arrangement for sensing car position includes a car movable in a first direction and in a second direction opposite the first direction, a light transmitter unit and a light receiver unit. Either the transmitter unit or the receiver unit is attached (e.g., fixed) to the movable car such that the movable unit moves in a linear direction with said car relative to the stationary unit. The receiver unit includes a first optical sensor, a second optical sensor and an optical cable located between the first and second sensors so that the sensors are optically coupled together by means of the cable. The cable is oriented in a direction which is parallel to the directions of movement of the elevator car (i.e., UP/DOWN directions).

Preferably, the optical cable of the receiver unit is a fluorescent optical fiber (FOF) cable which fluoresces in the infrared spectrum when illuminated by, for example, red light. In a further preferred embodiment, the emitter pulsates at a specific frequency in order to reduce the effects of ambient light on the receiver unit within the hoistway of the elevator system. In a further aspect of the present invention, the receiver unit includes an electronic computer (such as a microprocessor connected to a nonvolatile memory via suitable bus(es), whose memory includes computer instructions for storing data (or informational) signals from the optical sensors and for ascertaining or computing the position of the elevator relative to the landing.

Thus, it is a principal object of the present invention to detect car position reliably and efficiently.

It is a further object of the present invention to measure the precise position of a car continuously relative to a landing.

It is an additional object of the present invention to detect car position without a necessity for any mechanical coupling between a transmitter unit and a receiver unit of a car position measurement arrangement.

Further and still other objects of the present invention will become more readily apparent in light of the following detailed description when taken in conjunction with the accompanying drawing, in which:

BRIEF DESCRIPTION OF THE DRAWING

FIG. 2 is a side view of a prior art door zone leveling arrangement;

FIG. 3 is a perspective view showing top and bottom terminal landing limit switch assemblies of the prior art;

FIGS. 4 4A 4A(*a*) and 4A(*b*) are a schematic diagram and an accompanying legend explaining the operation of an optical potentiometer employed by the present invention;

DETAILED DESCRIPTION OF THE PREFERRED EMBODIMENTS AND BEST MODE

Figure 1:
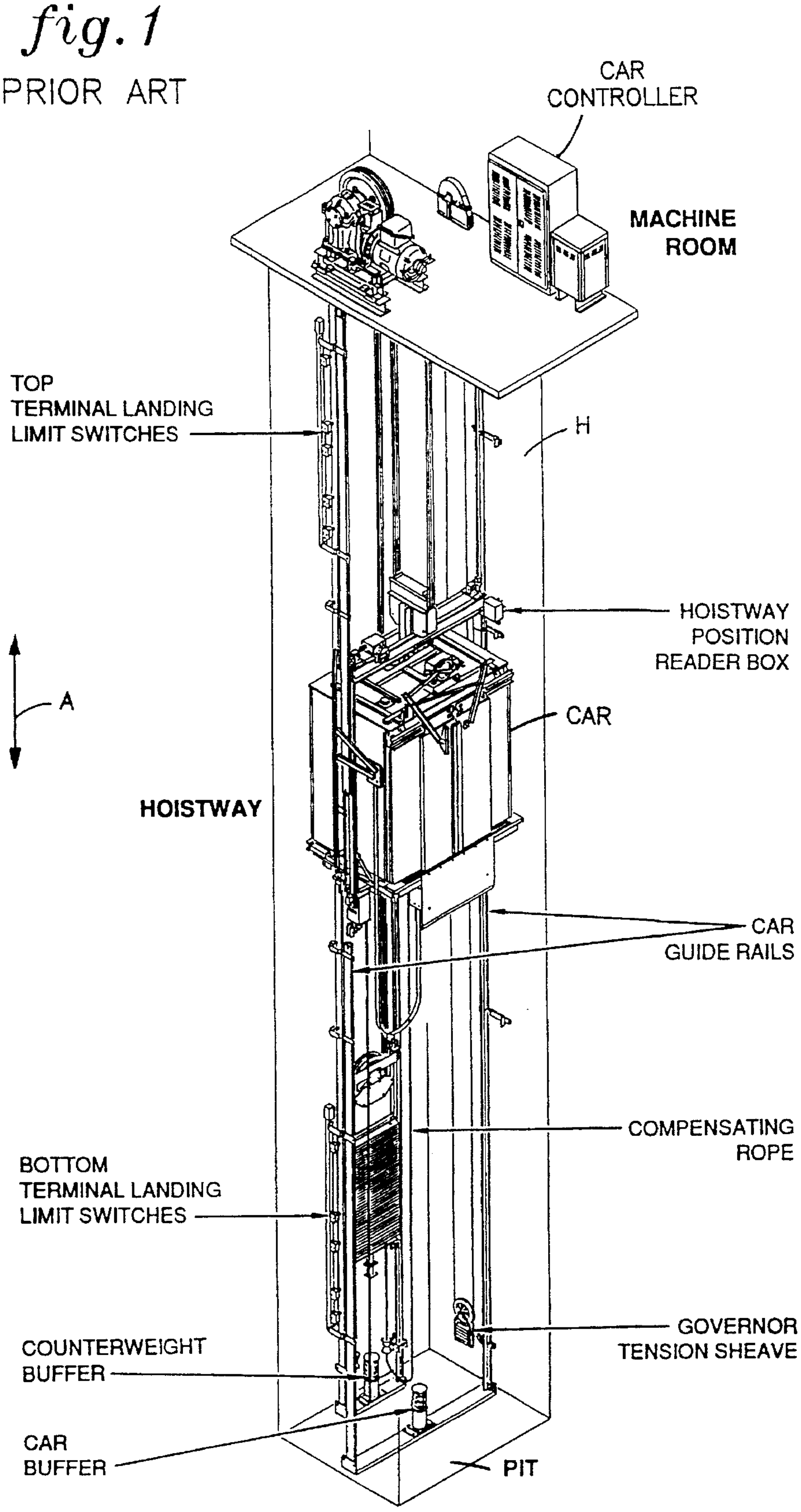
fig. 1 PRIOR ART
FIG. 1 is a perspective view of a prior art elevator system adapted to permit movement of an elevator car in UP and DOWN directions (arrow A) in a hoistway H.

FIG. 1 shows a hoistway H in which an elevator car is adapted to move in UP and DOWN directions (arrow A) as controlled by a car controller located in a machine room. FIG. 2 shows a system of steel bars or vanes attached to a floating steel tape running the length of the hoistway and a hoistway position reader box mounted on the car and used to monitor car position. The tape runs between a pair of guides on the face of the reader box. The vanes are precisely located with respect to their corresponding elevator landings (floors) to mark the stopping distance from the landing and door/leveling zones. The reader box includes switches that sense the location of each vane or steel bar as the car travels up and down the hoistway.

FIG. 3 shows limit switches which are mounted on brackets attached to the car guide rails at the top and bottom terminal landings. The limit switches are actuated (opened) by a cam (not shown) that rides with the car to insure that the car neither runs into the overhead structure, nor compresses the buffer. Typically, four limit switches are located at each terminal landing. The first two are slowdown limit switches that are actuated before the car reaches the landing. The direction limit switch is located at the landing and prevents all further travel beyond that point. The final limit switch is actuated when the car passes the terminal landing and prevents all further travel in either direction. If a car hits a final limit switch, power is removed and the hoist machine brake is dropped (applied).

Figure 4:
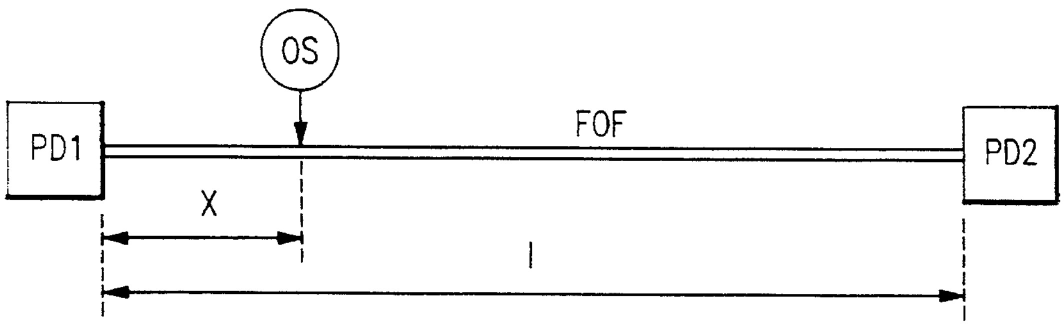
Prior Art FIG.4

FIGS. 4 and 4A explain the principles of operation for an optical potentiometer which is utilized in the transmitter and receiver units of the present invention. An optical source OS acts as a slider, while the potentiometer track includes a fluorescent optical fiber (FOF) cable. The FOF cable is of a type which is commercially available from, e.g., OPTECTRON, INC. of 375 Paramount Drive, Raynham, Mass. as PLASTIFO optical fibers.

Figure 5:
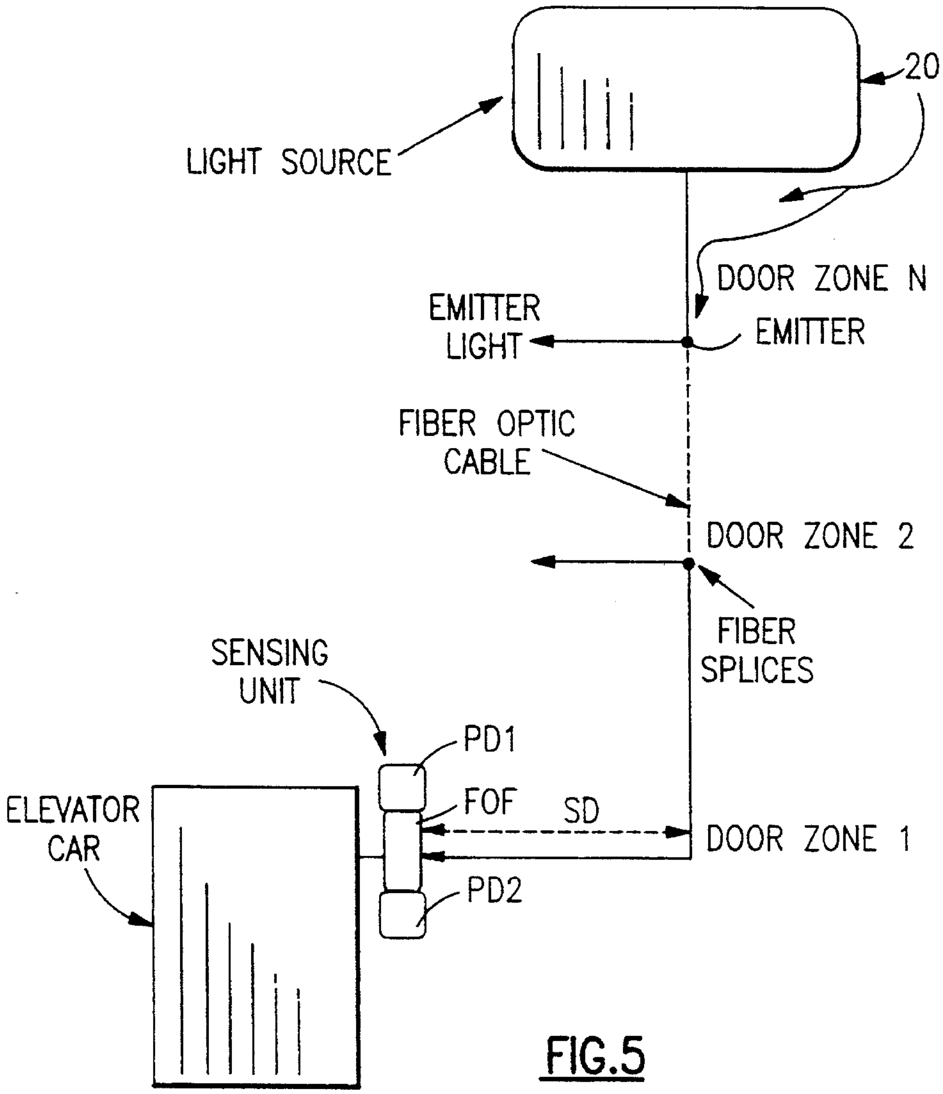
FIG. 5 is a schematic diagram of one arrangement according to the invention employing the optical potentiometer of FIG. 4.

According to a preferred embodiment of the present invention as shown in FIG. 5, a bundle of standard optical fibers (i.e., a standard optical fiber cable) (e.g., a standard fiber bundle marketed by Fiberoptics Technology Incorporated, Pomfret, Conn.) capable of transmitting light energy throughout its length is connected to a light source. Each fiber of the bundle is, e.g., 0.002 inch in diameter in a bundle having 3/16" outer diameter. Each fiber is separated from the bundle at a unique location along its length and (a fiber end) used as a light source (emitter) at each landing. The source is red light or any high intensity light with substantial energy in that part (e.g., red or near infrared) of the spectrum. Each emitter is located at a respective position proximate to an elevator floor landing along the entire length of the hoistway. Mounted on the movable elevator car is a sensing unit electrically connected to a detector unit (FIG. 7) for ascertaining the position of the sensing unit relative to an emitter. Preferably, the emitter is spaced from the FOF of the sensing unit by a distance (SD) of approximately 2" and centered on the unit when the elevator car is properly leveled (i.e., properly located at an elevator landing). Any suitable means (not shown e.g., U-shaped mail having minimal optical effect on light within emitter cable ) is used to locate the emitter cable within the hoistway. Other means is employed to mount the sensing unit to the elevator car (e.g., by a suitable housing connected to the car). Preferably, the optical cable of the sensing unit is exposed to the ambient atmosphere of the hoistway in a direction facing the optical fiber cable of the transmitter.

When light from an emitter impinges upon the center of the optical cable of the sensing unit, the light intensities (or energy densities) read by each of the photodetectors (photodiodes - PD1, PD2) are equal, i.e., $R_1=R_2$ (FIG. 4A). In operation, when the light from an emitter impinges on the fluorescent optical fiber (FOF) cable at a location closer to PD1 than to PD2, the intensity of light energy impinging on the sensor PD1 (and thus the energy density) is greater than the intensity of light energy impinging on the sensor PD2. Thus, in this case, the electrical (energy density) signal $R_1$ output from the sensor PD1 is greater than that $R_2$ output from PD2. Through empirical measurement, a linear relationship exists between a difference signal $R_D=R_1-R_2$ from the sensors PD1, PD2 and the vertical distance of the elevator car from the elevator floor landing L, all as is well understood by those skilled in the art in view of the present disclosure.

Figure 6:
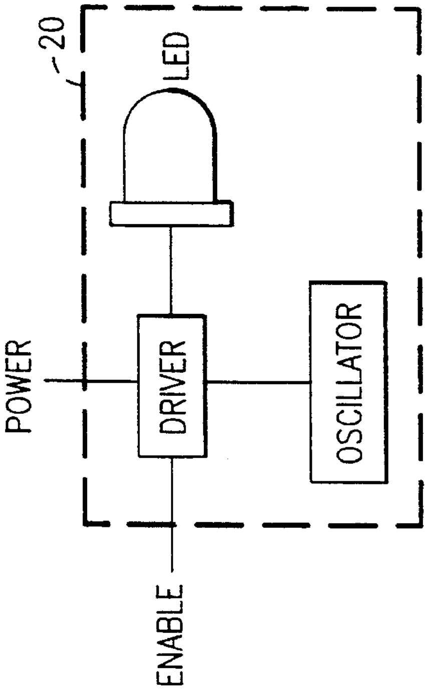
FIG. 6 is a block schematic circuit diagram of a preferred transmitter unit of the present invention.

In a still further preferred embodiment of the present invention, a single light source as shown in the previous FIG. 5 is replaced by independent transmitter units 20 as shown in FIG. 6. Each unit 20 comprises an LED electrically coupled to a driver connected to an oscillator circuit. The oscillator causes the LED to pulsate at a specific frequency (for example, 32 KHz) and to emit light having a wavelength of 6600 angstroms (red) or, alternatively, of approximately 6600 angstroms (±5%).

Figure 7:
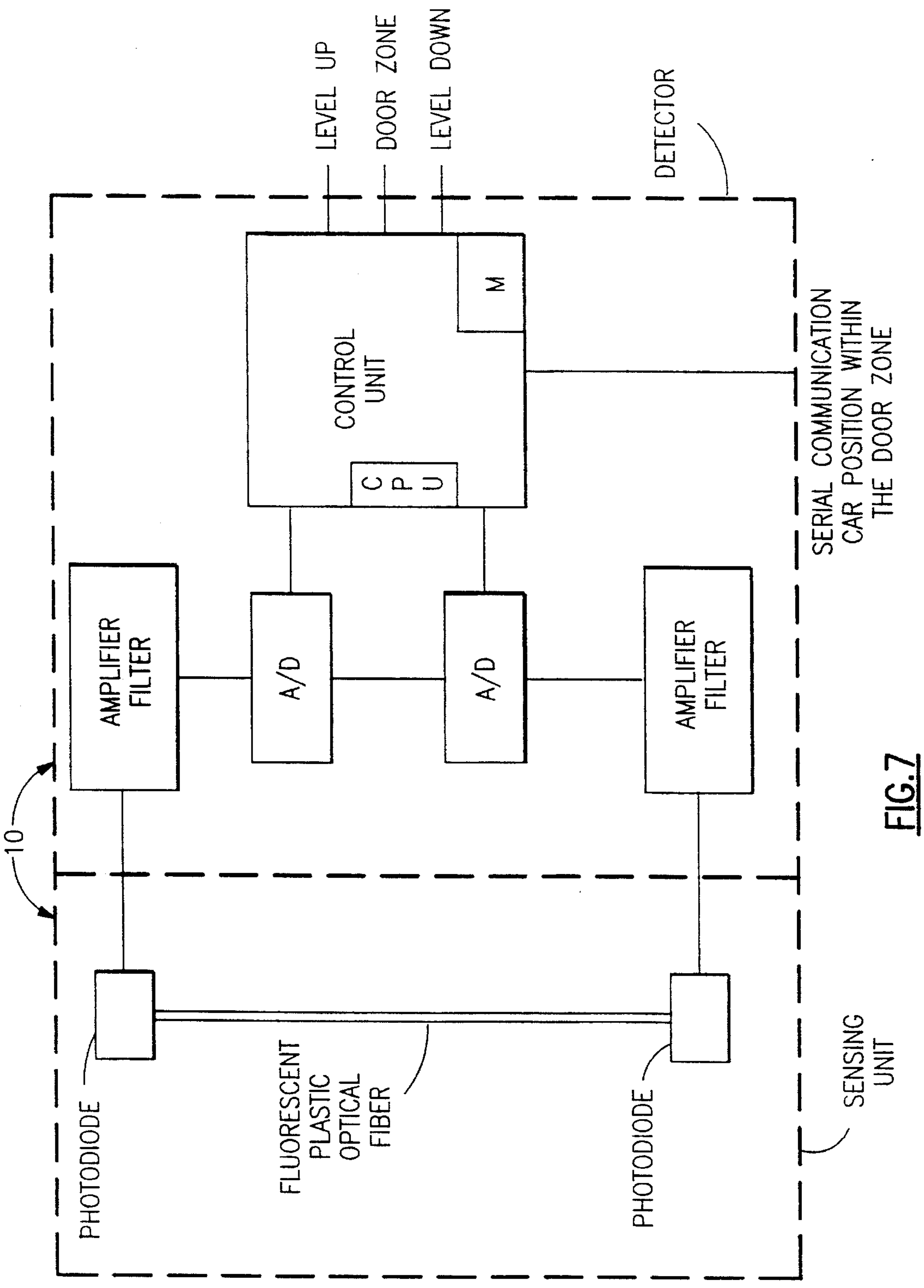
FIG. 7 is a block schematic diagram of a preferred receiver unit of the present invention.

A preferred receiver unit 10 is shown in FIG. 7. The unit 10 is fixed to the elevator car. For example, the unit 10 is mounted within a housing (not shown) fixed to the car. The unit 10 comprises a fluorescent optical fiber cable such as a PLASTIFO fluorescent plastic optical fiber marketed by Optectron, Inc. of Raynham, Mass., but doped such that the cable internally fluoresces and transmits light in the infrared spectrum. A dopant such as IR-144, a laser grade $C_{56}H_{73}N_5O_8S_2$ marketed by Eastman Laboratory Chemicals is used as the dopant for the fluorescent optical fiber cable.

Located at either end of the cable are the photodiodes PD1, PD2 for receiving the light energy transmitted by the (FOF) cable. The detectors PD1, PD2 are connected to the FOF cable in any conventional fashion well known in the art. Each photodiode PD1, PD2 is respectively connected to an amplifier/filter and an analog to digital (A/D) convertor. The A/D convertors are connected to a single control unit. Each amplifier/filter amplifies the electrical signal and passes only a desired frequency signal, for example, 32 KHz, to the analog to digital convertor which outputs to a control unit as shown in FIG. 7. The control unit includes a CPU connected to a nonvolatile memory and optionally to a volatile memory (such as RAM) via any suitable address, data and control bus (not shown).

Figure 10:
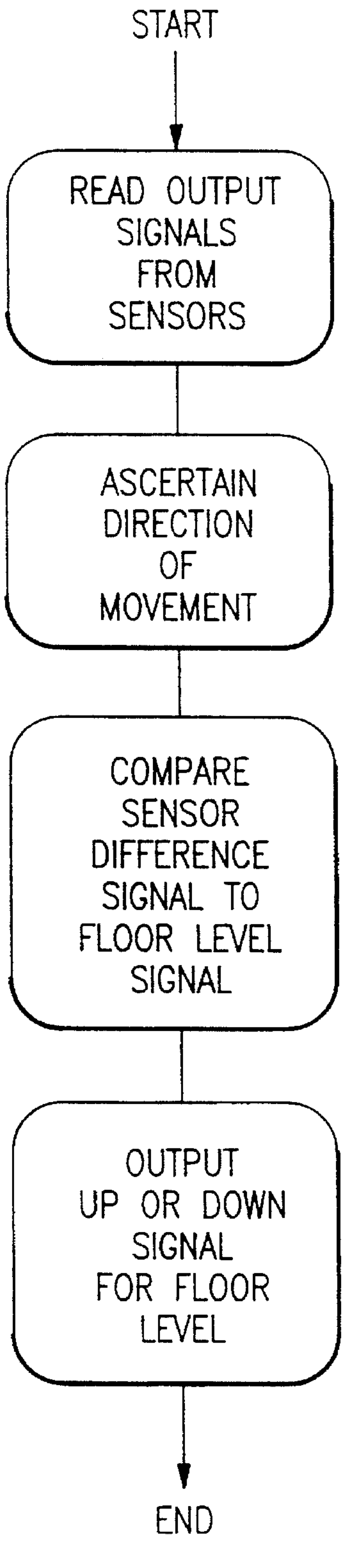
FIG. 10 is a high level logic flow diagram of steps for leveling an elevator car relative to a landing, the steps being stored within memory M of the control unit.
Figure 11:
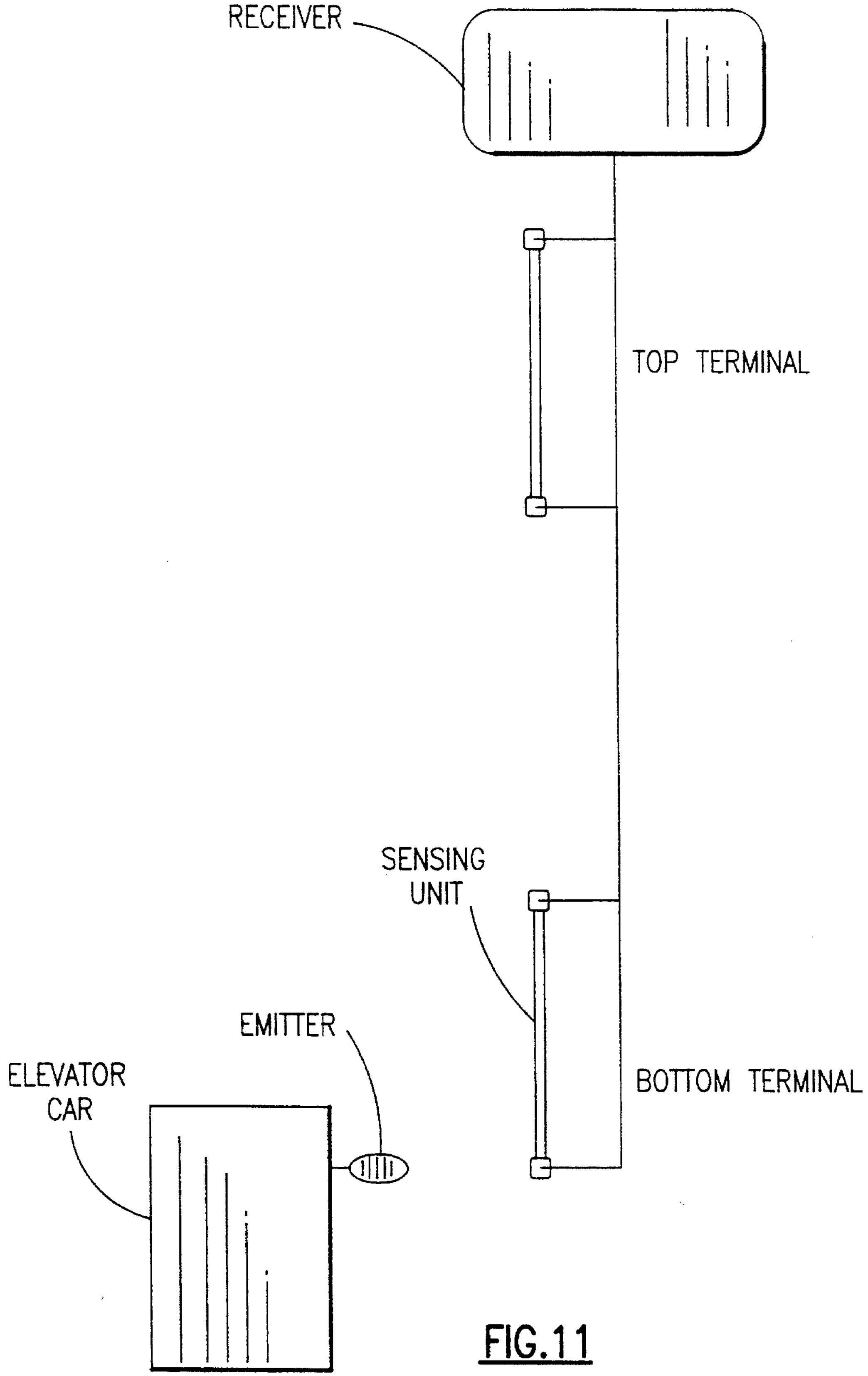
FIG. 11 is a schematic block diagram of another arrangement according to the invention wherein the transmitter unit is movable in the hoistway.

Stored within the memory M and appropriately accessed and executed by the CPU are computer instructions which periodically (e.g., 10 ms) carry out the high level logic flow steps shown in FIG. 10 as the elevator approaches a landing. Such approach is sensed and controlled, for example, by the one car controller in the machine room (FIG. 1). Configuring circuits to accomplish the various aspects of the invention and coding and storing the steps of FIG. 10 are well within the skill of the art in view of the present specification.

Figure 8:
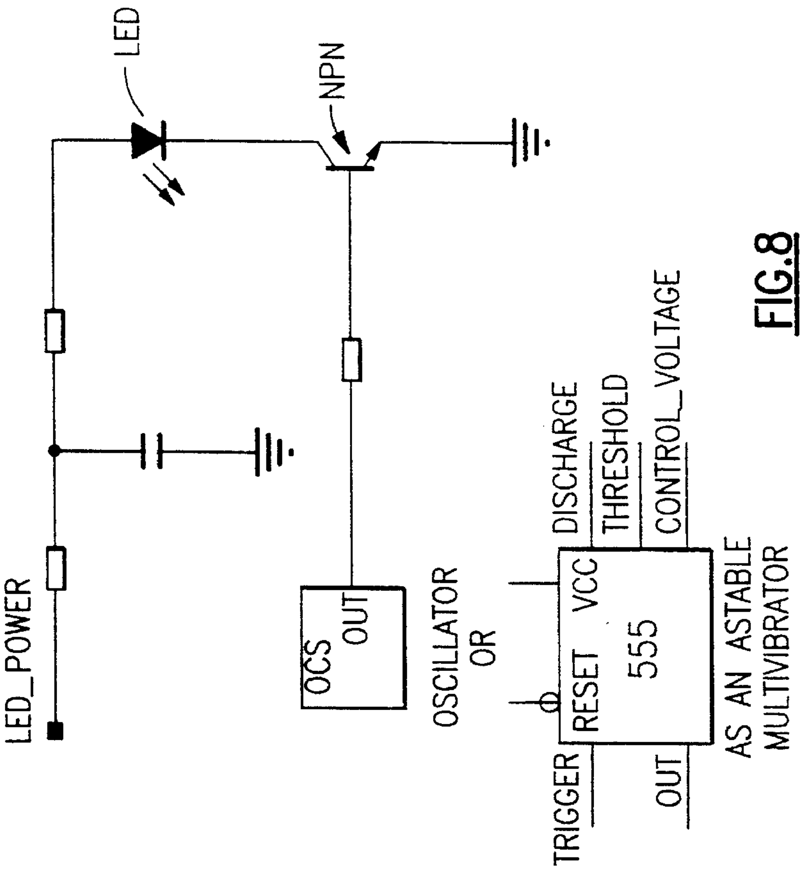
FIG. 8 is a detailed schematic circuit diagram of a preferred transmitter circuit for pulsing a light emitting diode at a specific frequency.
Figure 9:
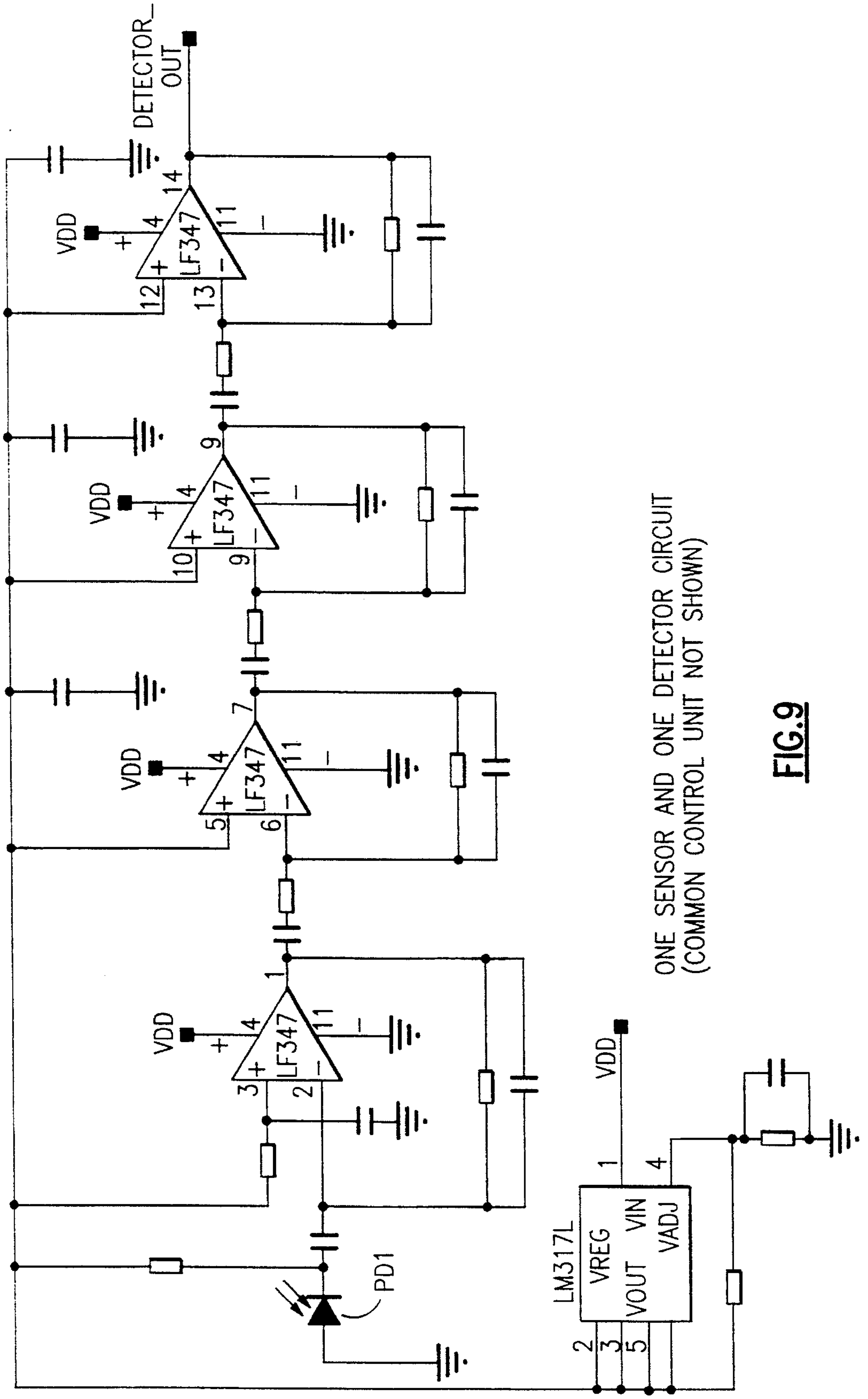
FIG. 9 is a detailed schematic circuit diagram of a preferred amplifier/filter for use in connection with the transmitter circuit of the FIG. 8.

FIG. 8 shows a preferred pulsing circuit for the transmitter circuit 20 of FIG. 6, while FIG. 9 shows one sensor and one detector circuit (without the control unit) of the receiver unit 10 shown in FIG. 7.

In FIG. 8, the emitter LED is an AND180CRP marketed by AND Corporation while the oscillator OCS is a 32 KHz oscillator manufactured by CTS Part No. CXO-65HG-2C-32.768KHZ. Alternatively, any suitable astable multivibrator may be appropriately connected and used to cause the LED to pulse at the specific frequency. The base of an NPN transistor is connected to the oscillator as shown.

In FIG. 9, the photodiode PD1 of the receiver unit 10 is a SFH217 photodiode manufactured by the Siemens Corporation while the transimpedance amplifier includes an LF347 operational amplifier manufactured by National Semiconductor Corporation. The photodiode PD2 is identical to the diode PD1. The filtering operation is performed by, for example, three bandpass filters (LF347) connected as shown in FIG. 9. A voltage regulator LM317L manufactured by Motorola, Inc. provides a suitable bias voltage $V_{bias}=8_{VDC}$ to the operational amplifiers.

The control unit may be a microcontroller chip INTEL 8751BH having two input ports connected to two 8 bit A/D convertors manufactured by National Semiconductor (Part #ADC0800) to convert pulses from the amplifier filter to digital values. Optionally, a peak detection or peak and hold circuits may be included between the A/D convertors and the control unit.

As shown in FIG. 10, as a car approaches a floor landing, two signal values $R_1$,$R_2$ are read and stored by the control unit, step 100, the direction of elevator car movement is determined by comparing the change in the magnitudes of the (step 102) two signal values $R_1$,$R_2$, the distance from level is determined or measured by comparing the signal difference $R_D=R_1-R_2$ with a predetermined signal corresponding to floor level, for example, 0 watts/$Cm^2$ and then a level up or level down signal is transmitted to the car control as needed (106).

Employment of the arrangement of the present invention could eliminate a requirement for a primary position transducer (optical encoder) from the entire elevator system.

While there has been shown and described what is at present considered preferred embodiments of the present invention, those skilled in the art will recognize that various changes and modifications may be made therein without departing from the spirit and scope of the present invention which shall be limited only by the scope of the appendant claims, in which:

What is claimed:

1. An arrangement for sensing elevator car position, comprising:

an elevator car movable in a first direction and in a second direction opposite said first direction;

a stationary light transmitter unit;

a movable light receiver unit for receiving light from said stationary light transmitter unit, said light receiver unit being attached to said elevator car so that said receiver unit is movable with said elevator car in said first direction and in said second direction, said movable light receiver unit including a first optical sensor, a second optical sensor and an optical cable optically connecting said first optical sensor to said second optical sensor, said optical cable being oriented in a direction which is parallel to said first and said second directions, wherein said optical cable is a fluorescent optical fiber cable which can transmit light internally in an infrared spectrum, said stationary light transmitter unit includes a light emitter for emitting light having a wavelength of approximately 6600 angstroms connected to a means for causing said light emitter to pulse said light at a specific frequency, said light receiver unit is electronically connected to an electronic computer, said electronic computer includes a memory containing instructions for ascertaining a position of said elevator car relative to a landing, and wherein said instructions include comparing a first electrical signal against a second electrical signal, said first electrical signal corresponding to an intensity of light energy detected by said first optical sensor and said second electrical signal corresponding to an intensity of light energy detected by said second optical sensor.

2. An arrangement as claimed in claim 1, wherein said specific frequency is approximately 32 KHz.

3. An arrangement for sensing elevator car position, comprising:

an elevator car movable in a first direction and in a second direction opposite to said first direction;

a movable light transmitter unit;

a stationary light receiver unit for receiving light from said movable light transmitter unit, said light transmitter unit being attached to said elevator car so that said light transmitter unit is movable with said elevator car in said first direction and in said second direction, said stationary light receiver unit including a first optical sensor, a second optical sensor and a fiber optical cable optically connecting said first optical sensor to said second optical sensor, said optical cable being oriented in a direction which is substantially parallel to said first and to said second directions, wherein said optical cable is a fluorescent optical fiber cable which can transmit light internally in an infrared spectrum, said stationary light transmitter unit includes a light emitter for emitting light having a wavelength of approximately 6600 angstroms connected to a means for causing said light emitter to pulse said light at a specific frequency, said light receiver unit is electronically connected to an electronic computer, said electronic computer includes a memory containing instructions for ascertaining a position of said elevator car relative to a landing, and wherein said instructions include comparing a first electrical signal against a second electrical signal, said first electrical signal corresponding to an intensity of light energy detected by said first optical sensor and said second electrical signal corresponding to an intensity of light energy detected by said second optical sensor.

4. An arrangement as claimed in claim 3, wherein said fluorescent optical fiber cable includes a dopant having a composition $C_{56}H_{73}N_5O_8S_2$.

* * * * *